Aug. 23, 1938.   J. D. McKIERNAN   2,127,959
UNIVERSAL CUTTING MACHINE
Filed May 28, 1937
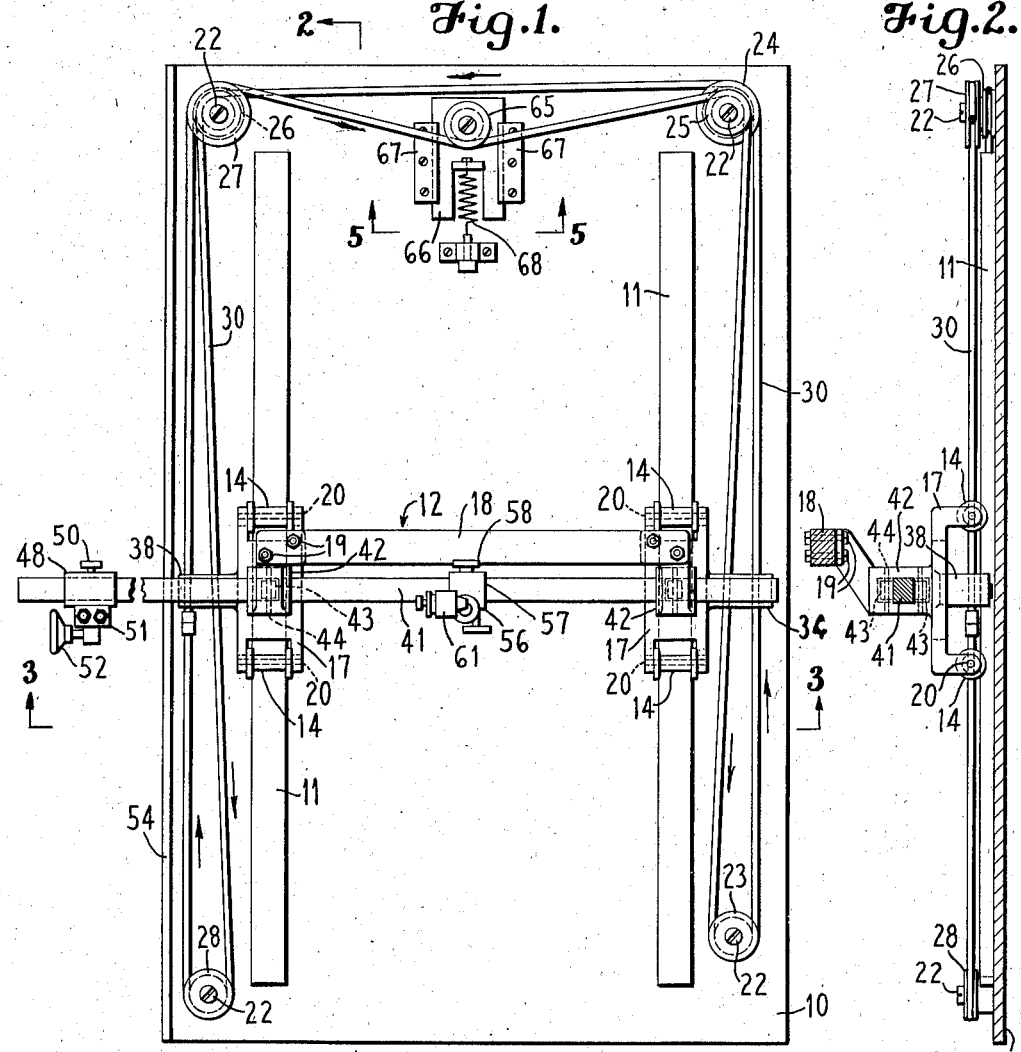
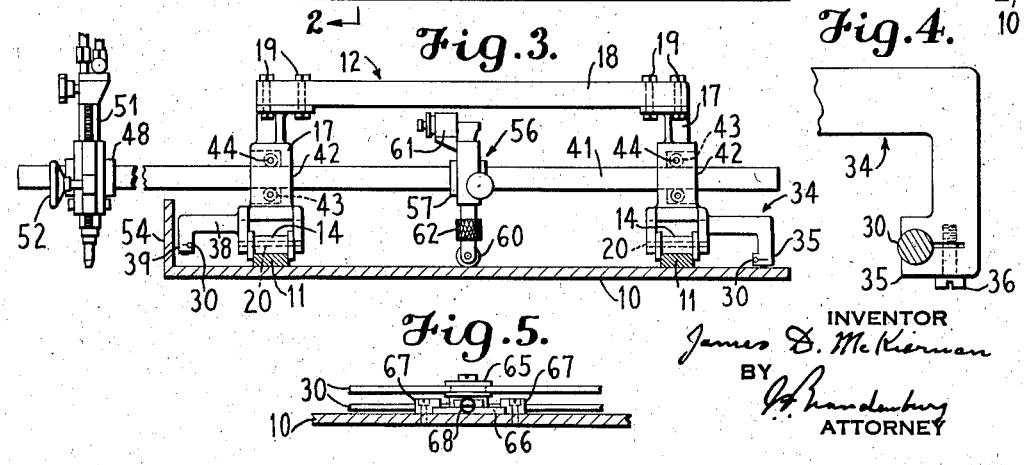
INVENTOR
James D. McKiernan
BY
ATTORNEY Patented Aug. 23, 1938

2,127,959

UNITED STATES PATENT OFFICE 2,127,959

UNIVERSAL CUTTING MACHINE

James D. McKiernan, Brooklyn, N. Y., assignor to Air Reduction Company, Incorporated, New York, N. Y., a corporation of New York Application May 28, 1937, Serial No. 145,279

9 Claims. (Cl. 266—23)

In one class of universal cutting machine the torch and tracer are connected with a common frame which has rectilinear motion along a track or guideway by which it is supported, and the track or guideway is itself a part of a rectilinearly movable frame having a direction of movement transverse of the direction of movement of the torch and tracer-supporting frame so that the two rectilinear motions combine to obtain universal movement in a plane for the torch and tracer.

In cutting machines of this character any angular shifting or swaying of the universally movable frame on its track prevents the torch from accurately reproducing the path followed by the tracer. Any distortion of the universally movable frame likewise causes inaccurate reproduction. These considerations have governed the design of double-rectilinear-motion cutting machines and have made it necessary for wheel-bases to be of substantial length and frames to be of sturdy and often heavy construction. Some attempts have been made to prevent any shifting of the torch and tracer-supporting frame by means of rack and pinion apparatus similar to cog-railways, but such an expedient is complicated and adds considerably to the cost of the machine.

It is an object of this invention to provide an improved universal cutting machine which is of simplified construction and especially adapted for machines having light-weight frames. The invention comprises a cutting machine of the double-rectilinear-motion type with cable connections between opposite sides of the supporting frame of such a nature that they cause equal movement of both sides of the frame to keep it always parallel to itself and to prevent any distortion of the frame when the force is applied from one side. The term "cable" is used in this specification in a broad sense which includes a cord, chain, or ribbon. The invention makes it unnecessary to use a wheel-base of substantial length for the supporting frame, and the machine can be made with light-weight frames because of the absence of the distorting stresses found in the machines of the prior art.

Other objects, features and advantages of the invention will appear or be pointed out as the specification proceeds.

In the accompanying drawing, forming a part hereof:

Fig. 1 is a top plan view of a cutting machine embodying the invention;

Figs. 2 and 3 are sectional views taken on the lines 2—2 and 3—3, respectively, of Fig. 1;

Fig. 4 is an enlarged detail view of one of the cable clamps; and

Fig. 5 is a sectional view on the line 5—5 of Fig. 1.

The cutting machine shown in the drawing has a base 10 and guides or rails 11 secured to the table near its opposite longitudinal edges. The rails 11 serve as a track for a carriage 12, which has wheels 14 running on the track. The wheels illustrated have flanges at both sides of the track, but other kinds of wheels and rails can be used. In fact the carriage can be made without wheels and constructed to slide on the guides or rails, but a wheeled carriage is preferable because less force is required to move it.

The carriage 12 includes side frames 17 rigidly connected to a cross-frame 18 by bolts 19. The ends of the side frames 17 are bifurcated to extend on opposite sides of the wheels 14. An axle 20 extends through each of the wheels 14 and the adjacent bifurcations of the side frame 17. Machines of larger size for operating on tracks of wider gauge can be made from the same side frames 17 with a longer cross-frame 18.

Studs 22 extending upward from the base 10 serve as axles for sheaves near the corners of the base. There is a sheave 23 near one end of the base 10 on the right side and two sheaves 24, 25 on a common axle 22 near the other end of the base on the right side. The sheaves 24 and 25 turn independently of one another and they may be of the same or different diameters.

Two sheaves 26, 27 are held by an axle 22 on the left side of the base 10 and at the same end as the sheaves 24, 25. At the other end of the left side of the base there is a sheave 28 which corresponds to the sheave 23.

An endless flexible element comprising a cable 30 passes around the sheaves 23—28 in the manner illustrated in Fig. 1. The terminations of the cable are joined by a connector 32 which makes the cable an endless flexible element.

The cable 30 passes around the sheaves 23—28 in such a manner that the runs of the cable on opposite sides of the carriage and parallel to the track 11 move in the same direction. The direction of movement of the different parts of the cable at a given instant are indicated by the small arrows in Fig. 1. The parallel run of the cable 30 on the right side of the machine extends between sheaves 23 and 24, and these sheaves are at the same height from the base 10 so that the run of cable is parallel with the base 10 as well as with the track 11. Likewise, on the other side of the machine the sheaves 27 and 28 are at the same height above the base 10 so that the run of cable between them is parallel to both the base and track.

A bracket 34 extending from the right-hand side frame 17 has a downwardly extending end shaped to fit around the cable 30 and slotted for a distance away from the cable 30 to form a split clamp 35. A clamping screw 36 draws the two sides of the clamp together to grip the cable 30.

A bracket 38 and clamp 39 on the left-hand side of the carriage 12 is similar in construction to the bracket 34 and clamp 35 just described except that there is some difference in the heights of the clamps corresponding to the level of the cable runs with which the clamps connect.

The universally movable frame of the cutting machine comprises a bar 41 of square cross-section which extends through guideways 42 in the side frames 17. Friction of the bar 41 in the guideways is reduced by anti-friction rollers 43 which turn on axles 44. The bar 41 slides in the guideways 42 in a direction at right angles to the rails 11. If the machine is widened by substituting a longer cross-frame 18, the bar 41 is replaced by one of greater length.

A torch-holder 48 fits over the bar 41 and can be held in any desired position on the bar by a clamping screw 50. A torch 51 can be moved up or down by rack and pinion means operated by a hand-wheel 52 to control the spacing of the torch tip from the work. An upstanding flange 54 on the left side of the base 10 serves as a shield to protect the parts behind it from the heat of the torch.

A tracer 56 has a bracket 57 that fits over the bar 41 and can be held in any set position along the bar by a clamping screw 58. The tracer includes a traction wheel 60 driven by an electric motor 61 and steered by means of a hand grip 62. The traction wheel bears against the base 10 which is solid across the space between the rails 11 to serve as a pattern table.

When the machine is used with the tracer 56, a drawing or print is placed on the base 10 between the rails 11 and the traction wheel is steered to follow the outline of the drawing. In place of the tracer 56 a template-follower can be connected with the bar 41 when it is desirable to guide the travel of the torch from a template instead of a drawing. Since all parts of the bar 41 partake of the same movement, the torch 51 follows the same path as that traveled by the tracer 56 regardless of the distance between the torch and tracer lengthwise of the bar 41.

The cable is kept taut at all times by a sheave 65 which deflects the run of cable between the sheaves 25 and 27. The sheave 65 is carried by a slide 66 which moves in guides 67 on the base 10. A spring 68 fastened at one end to the slide 66 and anchored at the other end to the base 10, holds the sheave 65 against the cable 30 with enough force to obtain the desired tension in the cable.

The invention is not limited to the machine described, and changes and modifications may be made without departing from the invention as defined in the claims.

I claim:

1. A cutting machine including a torch-supporting structure, a carriage on which said structure is supported, guides along which the carriage travels, and flexible cable means connected to and movable with the carriage, and constructed and arranged to hold the carriage parallel to itself during its movement along said guides.

2. A universal cutting machine including a frame and guide means along which the frame moves, a second frame supported by the first frame and movable along the first frame transversely of the direction of movement of the first frame along the guide means, torch and tracer-holder devices secured to the second frame, flexible cable connections fastened to opposite sides of at least one of said frames, and sheaves around which the cable connections pass to control the direction of movement of said cable connections in such a manner that they hold the frame to parallel positions during its movement.

3. In a universal cutting machine of the double-rectilinear-motion type with two movable frames one of which is supported by the other and movable thereon transversely of the direction of movement of the first frame, the combination with at least one of said frames of a flexible cable connected to opposite sides of the frame with a substantial run of cable extending along each side of the frame in the direction that the frame moves, and sheaves around which the cable passes to change its direction of travel so that both connections with the frame always move in the same direction.

4. A universal cutting machine including a two-rail track, a wheeled carriage which runs along the track, a single sheave at one end of each rail of the track, two sheaves at the other end of each rail, a continuous cable which runs along the right side of the machine substantially parallel to the right rail, passes around the single sheave at the end of that rail, and then back around one of the two sheaves at the other end of the right rail, across to and around one of the two sheaves at the corresponding end of the left rail, then to the single sheave of said left rail, around that sheave and back around the remaining one of the two sheaves, and across to and around the second of the two sheaves at the right side of the machine, connections between opposite sides of the carriage and runs of the cable that move in the same direction for causing equal movement of both sides of the carriage lengthwise of the track, a frame supported by and movable on the carriage in a direction transverse of the direction in which the track extends, and torch and tracer holders connected with said frame at spaced points.

5. A universal cutting machine comprising a stationary guideway, a carriage which moves along said guideway but extends for only a short distance along the guides, apparatus for causing the carriage to remain at a constant angular relation to the guides so that all positions of the carriage are parallel to one another, said apparatus including a continuous flexible element and sheaves around which the flexible element runs, said sheaves being located near opposite ends of the guides and the flexible element passing around the sheaves in a relation which obtains runs of the flexible element that move in the same direction along opposite sides of the guideway, connections between the carriage and said runs of the flexible element, and torch and tracer supporting means supported by and movable along the carriage.

6. A universal cutting machine including in combination a track, a wheeled carriage on the track, said carriage having a short wheel-base, cable connections between opposite sides of the carriage of such a nature that movement of the cable with one side of the carriage causes equal movement of the other side of the carriage and thus prevents swaying of the carriage on the track, a frame movable on the carriage transversely of the direction of movement of the carriage along the track, and torch and tracer holder means connected with the frame.

7. A universal cutting machine including a torch-holder, a tracer-holder, a common frame to which both of said holders are connected, guide means in which the frame moves with rectilinear motion, a carriage supporting the guide means, a track along which the carriage moves in a direction transverse of the rectilinear motion of the carriage, and motion-transmitting connections external of the carriage and through which movement of one side of the carriage is transmitted to the other, said motion-transmitting connections including a flexible tension member.

8. In a universal cutting machine having a frame to which a torch and tracer are attached, and guides in which the frame moves, and having a wheeled carriage supporting the guides, and a track along which the carriage runs in a direction transverse of the movement of the frame in its guides, the improvement of sheaves in a given relation to the track, and a cable connected with opposite sides of the carriage and passing around the sheaves in such a manner that movement of one side of the carriage acts through the cable to cause substantially equal movement of the other side of the carriage to prevent the carriage from swaying on the track.

9. A universal cutting machine comprising a bar for supporting a torch and tracer, guides in which said bar is axially movable, a carriage supporting the guides, said carriage including two side frames running on parallel rails which extend transversely of the bar, each of said side frames supporting one of the guides, a cross-frame rigidly connected to the side frames, and detachable fastenings connecting the cross-frame and side frame so that the machine can be increased in width to cover a larger field by replacing the cross-frame with one of greater length.

JAMES D. McKIERNAN.